United States Patent [19]
Chambers et al.

[11] Patent Number: 5,572,483
[45] Date of Patent: Nov. 5, 1996

[54] METHOD OF REDUCING NOISE IN SEISMIC SIGNALS BY ADAPTIVE FILTERING OF A NOISE REFERENCE

[75] Inventors: Ronald E. Chambers; Gary A. Sitton, both of Houston; Josef Paffenholz, Missouri City, all of Tex.

[73] Assignee: Western Atlas International, Inc., Houston, Tex.

[21] Appl. No.: 507,653

[22] Filed: Jul. 25, 1995

[51] Int. Cl.⁶ .................................................. G01J 1/36
[52] U.S. Cl. ............................ 367/45; 367/21; 367/38
[58] Field of Search ................................. 367/21, 38, 43, 367/44, 45, 46; 364/421

[56] References Cited

U.S. PATENT DOCUMENTS

| | | | |
|---|---|---|---|
| 4,468,761 | 8/1984 | Rietsch | 367/43 |
| 4,809,238 | 2/1989 | Bishop et al. | 367/46 |
| 5,448,531 | 9/1995 | Dragoset, Jr. | 367/45 |

OTHER PUBLICATIONS

Linville et al., "A procedure for optimally removing localized coherent noise", Geophysics, vol. 60., No. 1. pp. 191–203.

Primary Examiner—Ian J. Lobo
Attorney, Agent, or Firm—Richard A. Fagin

[57] ABSTRACT

A method of reducing effects of noise in seismic signals generated by a plurality of seismic sensors at spaced apart locations from a seismic source is disclosed. Each of the signals is represented by a signal trace in a record section. The method includes the steps of isolating noise in the signal traces, time aligning corresponding portions of the noise in the traces thereby generating time-aligned noise traces, stacking the time-aligned noise trace to generate a stacked noise trace, replicating the stacked noise trace at each corresponding trace position in the record section, restoring the replicated traces to the original trace time positions by reversing the step of time-aligning to generate noise signature traces, comparing the noise signature traces to corresponding signal traces to generate filters which substantially minimize a measure of the difference between the noise signature traces and the signal traces. The noise signature traces are then filtered and the resulting filtered noise signature traces are subtracted from the signal traces. In a preferred embodiment the steps of comparing, generating filters, filtering and subtracting comprise linear adaptive filtering.

In a particular embodiment the step of isolating the noise comprises bandpass filtering the signal traces.

27 Claims, 6 Drawing Sheets

METHOD OF REDUCING NOISE IN SEISMIC SIGNALS BY ADAPTIVE FILTERING OF A NOISE REFERENCE

BACKGROUND OF THE INVENTION

1. Field of the Invention

The present invention is related to the field of geophysical exploration. More specifically, the present invention is related to methods for reducing the effects of noise on the quality of seismic surveys.

2. Description of the Related Art

Seismic surveys are used to determine the presence of subsurface structures in earth formations which may contain useful materials such as petroleum. Seismic survey methods known in the art include positioning a plurality of seismic sensors, which can be geophones, at spaced apart locations in a predetermined pattern on the surface of the earth. The sensors are typically connected to a recording system. Another type of seismic survey includes positioning seismic sensors in a predetermined pattern on the water bottom in a shallow marine seismic survey. Still another type of seismic exploration includes positioning seismic sensors near the water surface in a marine seismic survey. The sensors in marine surveys can be hydrophones.

An acoustic energy source, which can include sources such as dynamite, vibrators or air guns is then activated to impart acoustic energy into the earth. The source is typically located at a predetermined position in the vicinity of the seismic sensors. The acoustic energy from the source radiates outwardly into the earth. Some of the acoustic energy travelling through the earth can be partially reflected back towards the earth's surface by subsurface acoustic impedance boundaries, called reflectors, which may exist within the earth. The reflected acoustic energy can be detected by the sensors. The sensors generate electrical signals proportional to the amplitude of the acoustic energy. The electrical signals from each sensor are typically recorded, with respect to time, in the recording system.

Various forms of images corresponding to structures within the earth can be generated by presenting the recordings of the electrical signals on a 2-dimensional graph. The graph includes "traces", each trace representing an individual seismic sensor signal recording or combinations of signal recordings from a plurality of sensors, positioned on the graph corresponding to the location at which each seismic sensor was positioned during the recording of the survey. Such a graph is referred to as a record section.

The signals generated by the sensors are susceptible to interference by various sources of noise. Noise in the signals reduces the clarity of the images of the subsurface structures within the earth. One source of noise is called "ground roll". Shallow marine surveys can have an equivalent source of noise called "mud roll". Ground roll and mud roll comprise generally up-and-down motion of the surface of the earth or the sea bottom. The motion propagates substantially along the surface of the earth or sea bottom, where the up-and-down motion can be imparted to the geophones, causing signals to be generated which are unrelated to reflection of seismic energy from within the earth. Other sources of noise can include scattered reflections, multiple reflections, wind noise and electrical noise impressed onto the seismic recording system.

Various methods are known in the art for processing the traces to reduce the effects of noise on the seismic signals. One method known in the art is called (f–k) transform filtering. (f–k) transform filtering includes performing a 2-dimensional Fourier transform on a plurality of the traces in order to convert at least a portion of the record section, which is initially a graph with respect to time and position, into a graph with respect to frequency and wavenumber. Noise can be removed from the (f–k) transformed record section by applying a so-called "velocity filter" to the transformed graph. Noise, which frequently exhibits an apparent velocity unrepresentative of the velocity of acoustic energy travelling through earth formations, can be substantially reduced by using velocity filters. A drawback to (f–k) transform filtering is that in order for the 2-dimensional Fourier transform to be precise, the recorded traces must represent seismic sensors which are uniformly spaced apart from each other. It is extremely difficult in practice to achieve truly uniform spacing between sensors. Another drawback to (f–k) transform filtering is that seismic events having a higher spatial frequency than the spacing between seismic sensors will cause error in the transformed traces, the error referred to as "spatial aliasing".

It is also known in the art to reduce noise effects in seismic signals by "slant stacking". Traces in the record section are summed or "stacked" after applying a time offset to each trace which depends on that trace's equivalent distance between the sensor and the seismic energy source. The time offset is referred to as the apparent "moveout", or change in a time of recording of a correlative part of a noise event present on each trace. Slant stacking has the disadvantage of being difficult and expensive to perform. Slant stacking is also susceptible to error caused by dispersion of the noise source. Dispersion is a characteristic of some noise sources which includes the apparent velocity of various components of the noise being dependent on the frequency of those components.

Still another method known in the art for removing noise sources is called median filtering. Median filtering is described, for example in "Vertical Seismic Profiling", Bob A. Hardage, Handbook of Geophysical Exploration Volume 14A, Geophysical Press Limited, London, 1985 (pp. 172–186). Median filtering is used because it can be particularly effective in reducing effects of short duration noise events, called "spikes", from seismic signals. A particular drawback to median filters, however, is that they are non-linear. Median filters applied to seismic signals in different stages of signal processing can have different effects on the final result. Median filters are also susceptible to generation of artifacts, a particular one being called "whiskers", which are described in the Hardage reference, supra, on p. 186.

Accordingly, it is an object of the present invention to provide a method of identifying and reducing noise in seismic signals which is not dependent on uniformity of spacing of the seismic sensors used to record the seismic signals.

It is a further object of the present invention to provide a method for identifying and reducing noise in seismic signals which is not susceptible to spatial aliasing.

It is yet another object of the present invention to provide a method of identifying and reducing noise in seismic signals which is not susceptible to generation of artifacts.

It is still a further object of the present invention to provide a method of identifying and reducing noise in seismic signals which is not substantially affected by dispersive characteristics of the noise.

SUMMARY OF THE INVENTION

The present invention is a method of reducing the effects of noise in seismic signals. The signals are generated by a plurality of seismic sensors at spaced apart locations from a seismic source. The signals are represented by signal traces in a record section. The method includes the steps of isolating the noise in the signal traces, time-aligning corresponding portions of the noise in the traces thereby generating time-aligned noise traces, stacking the time-aligned noise trace to generate a stacked noise trace, replicating the stacked noise trace at each corresponding trace position in the record section and restoring the replicated traces to the original trace time positions by reversing the step of time-aligning to generate noise signature traces. The noise signature traces are then compared to corresponding signal traces to generate filters which substantially minimize the difference between each noise signature trace and the corresponding signal trace. The noise signature traces are then filtered and the resulting filtered noise signature traces are subtracted from the signal traces. In a preferred embodiment the steps of comparing, generating filters, filtering and subtracting comprise linear adaptive filtering.

In a particular embodiment of the invention, the step of isolating the noise comprises bandpass filtering the signal traces.

DESCRIPTION OF THE PREFERRED EMBODIMENT

Figure 1:
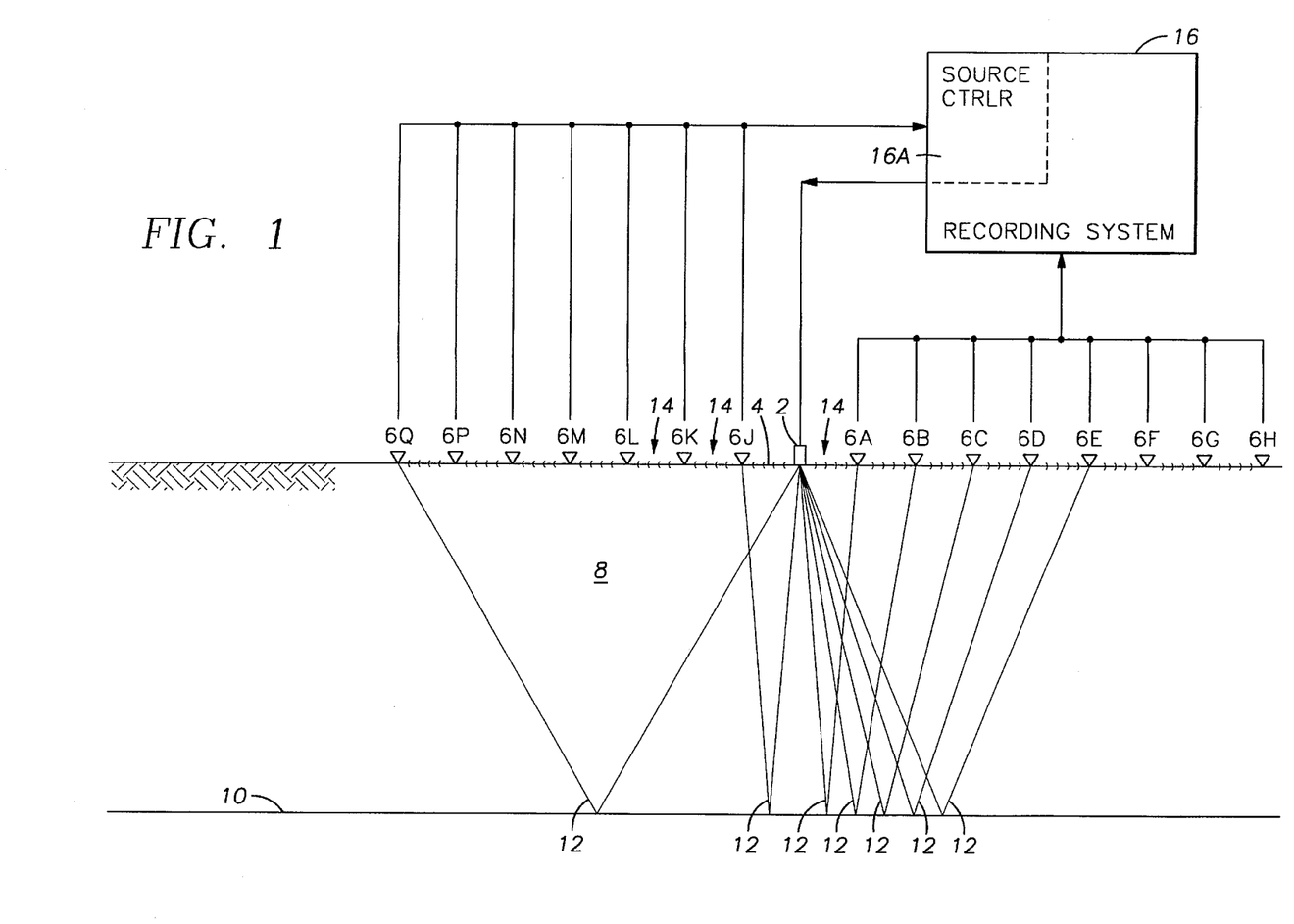
FIG. 1 shows a typical arrangement of seismic sensors used to record a seismic survey.

A typical seismic survey can be better understood by referring to FIG. 1. Seismic sensors, shown generally at 6A through 6Q can be positioned in a predetermined pattern along the surface of the earth 4. The sensors 6A–6Q can be geophones. It is to be understood that submerged hydrophones positioned near the water surface, as is typically the case in a marine seismic survey, can also be used in a seismic survey according to the present invention. The sensors 6A–6Q generate electrical signals proportional to the amplitude of seismic energy reaching them. The sensors 6A–6Q can be operatively connected to a recording system 16. The recording system 16 includes equipment (not shown separately for clarity of the illustration) for recording, with respect to time, the electrical signals generated by each sensor 6A–6Q.

A seismic energy source 2 is typically positioned at a predetermined location on the earth's surface in the general vicinity of the sensors 6A–6Q. The source 2 can be dynamite, a vibrator, or in the case of a marine survey can be air guns or similar apparatus known in the art. The source 2 can be electrically or telemetrically connected to a source controller 16A, which can form part of the recording system 16.

The source controller 16A provides a signal which initiates the source 2 at a time precisely determinable by the recording system 16. Recordings of signal amplitude from each sensor 6A–6Q with respect to time are typically started upon, and synchronized to, initiation of the source 2 by the controller 16A.

Seismic energy from the source 2 radiates generally outwardly from the source 2 into the earth 8. Some of the energy can travel downwardly and be reflected by acoustic impedance discontinuities called "reflectors", such as one shown generally at 10, which may be present within the earth 8. Reflected seismic energy travels generally upwardly back through the earth 8 and eventually can reach some of the sensors 6A–6Q. The amount of time elapsed between actuation of the source 2 and reception of reflected energy at each sensor 6A–6Q depends on, among other things, the distance between the source 2 and the individual sensor, the velocity at which the seismic energy travels through the earth 8, and the length of the shortest reflective path, such paths shown generally at 12, between the source 2 and sensor 6A–6Q. As is understood by those skilled in the art, the shortest reflective path 12 to each sensor 6A–6Q typically is characterized by the angle at which the energy approaches a line normal to the discontinuity 10 being equal to the angle at which the energy is reflected respective to the line normal to the discontinuity 10. The time elapsed for reflected seismic energy to reach a particular sensor 6A–6Q can be approximated by a relationship known to those skilled in the art and described by the expression:

$$T_x^2 = T_0^2 + \frac{X^2}{V^2} \tag{1}$$

where X represents the distance from the source 2 to the particular sensor, $T_x$ is the seismic energy travel time from the source 2 to the sensor having a distance equal to X, V is a velocity term corresponding to seismic energy velocity in the earth 8, referred to as the effective normal moveout velocity, and $T_o$ is the acoustic energy travel time to the sensor having a distance substantially equal to zero, this sensor also known as a zero-offset sensor.

To better illustrate the present invention, a particular source of noise, called "ground roll" will be explained herein. Ground roll is known to those skilled in the art, and is one of a plurality of noise sources that can interfere with recording seismic signals caused by energy reflected from the impedance discontinuities 10. Some of the energy from the source 2 can travel substantially along the surface of the earth 4 in the form of an up-and-down motion of the surface of the earth. The direction of propagation of the ground roll is typically perpendicular to the motion of the surface of the earth. As is known in the art, the velocity of ground roll is typically slow compared to the velocity of acoustic energy propagating in other modes through the earth 8. Ground roll is shown generally at 14.

Other sources of noise, such as multiple reflections from other acoustic impedance discontinuities (not shown) in the earth 8, air noise at the earth's surface, and impressed electrical noise can also corrupt the signals from the sensors 6A–6Q. It is to be understood that the present invention is not limited to reduction of noise caused by ground roll or mud roll. Ground roll is explained herein only to illustrate the present invention, particularly because ground roll is easily visually discernable on a seismic record section.

Figure 2:
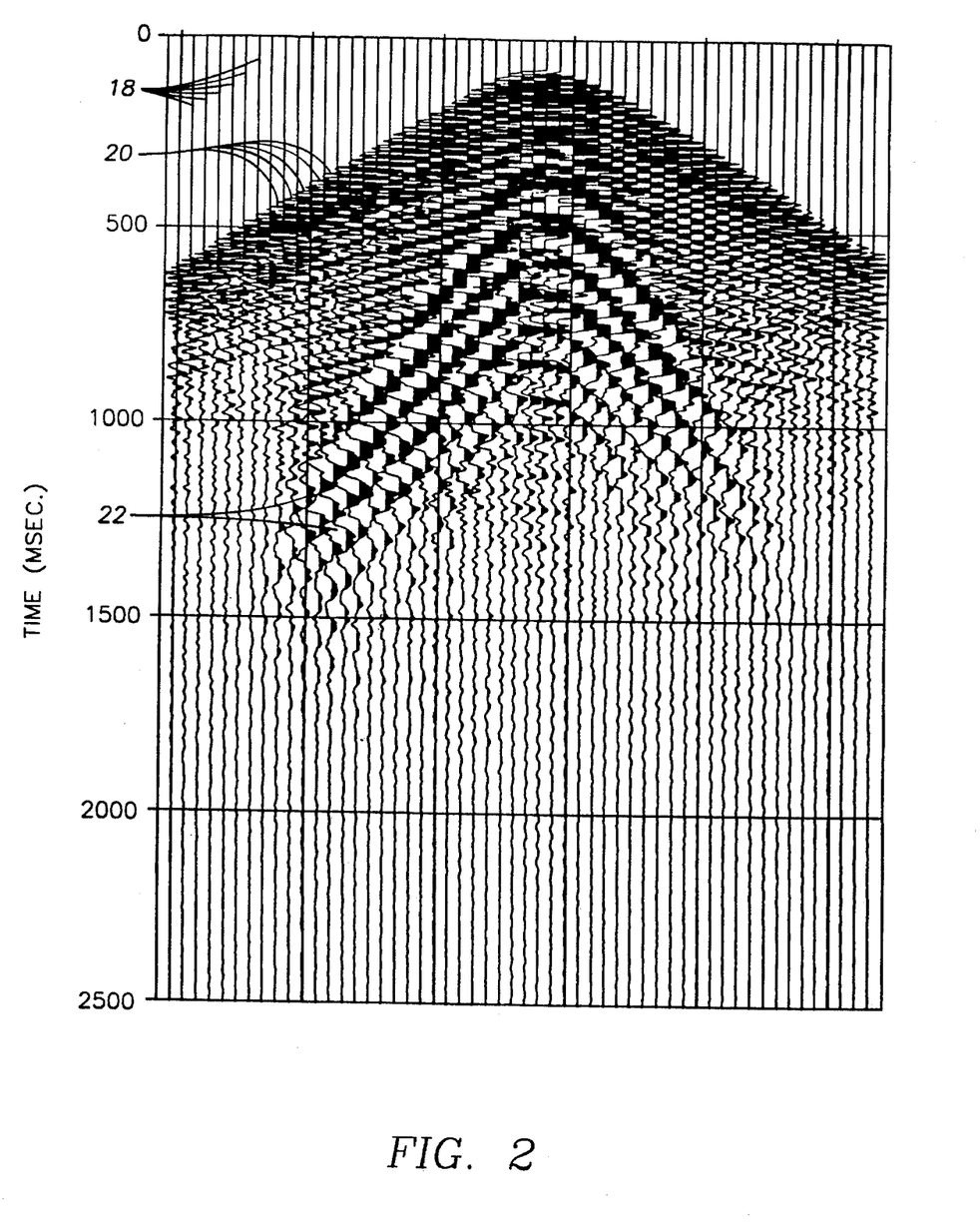
FIG. 2 shows a plot of individual traces recorded by sensors in an arrangement of seismic sensors similar to the arrangement of FIG. 1, the plot being called a record section.

Recordings of the signals generated by each sensor 6A–6Q can be plotted in the form of a graph, called a record section, such as one shown in FIG. 2. The graph in FIG. 2 includes traces 18. Each trace 18 in FIG. 2 corresponds to a recording of the signal generated by one of the sensors (6A–6Q in FIG. 1). Typically the position of each trace 18 along the coordinate axis of the graph corresponds to the position along the surface of the earth (4 in FIG. 1) of the sensor 6A–6Q which generated the particular trace 18. The ordinate axis of the graph represents time, typically referenced to the time of actuation of the seismic energy source (2 in FIG. 1) wherein zero time corresponds to the time of actuation of the seismic energy source 2.

Reflected seismic energy can be observed as first arrivals, shown generally at 20. The first arrivals 20 typically occur at a time which increases as distance increases between the source 2 and the sensor 6A–6Q which generated the trace 18. The relationship of the first arrival 20 time with respect to sensor position typically follows the relationship in equation (1).

While the description of the present invention includes traces 18 which correspond individually to the signals from an individual seismic sensor (6A–6Q in FIG. 1), it is to be understood that it is also possible to use traces 18 which represent combinations of signals from a plurality of sensors (6A–6Q in FIG. 1). For example, groups of traces each representing an individual sensor can be summed or stacked by a process known in the art called common-mid-point (CMP) stacking. Other forms of combining signals from a plurality of sensors which are known in the art include common-source-point (CSP) stacking and common-receiver-point (CRP) stacking. It is to be understood that record sections which can be processed according to the method of the present invention are not limited to record sections comprising the single-sensor signal traces (18 in FIG. 1).

The previously described ground roll (14 in FIG. 1) can be observed in FIG. 2 generally at 22. The ground roll 22 is typically characterized by much longer time intervals between successive amplitude peaks than is the reflected seismic energy, because ground roll typically has a spectrum consisting of more lower frequencies than in reflected seismic energy. The ground roll 22 is also characterized by arrival time increasing with respect to sensor distance from the source 2 in a different relationship than that described in equation (1). The arrival time relationship of the ground roll 22 is different than in equation (1) because the ground roll 22, as previously explained, typically travels along the surface of the earth. For the ground roll 22, the shortest path length (12 in FIG. 1) from the source 2 to each sensor is generally linearly proportional to the sensor distance to the source 2, so the arrival time will increase linearly with respect to sensor distance.

Figure 3:
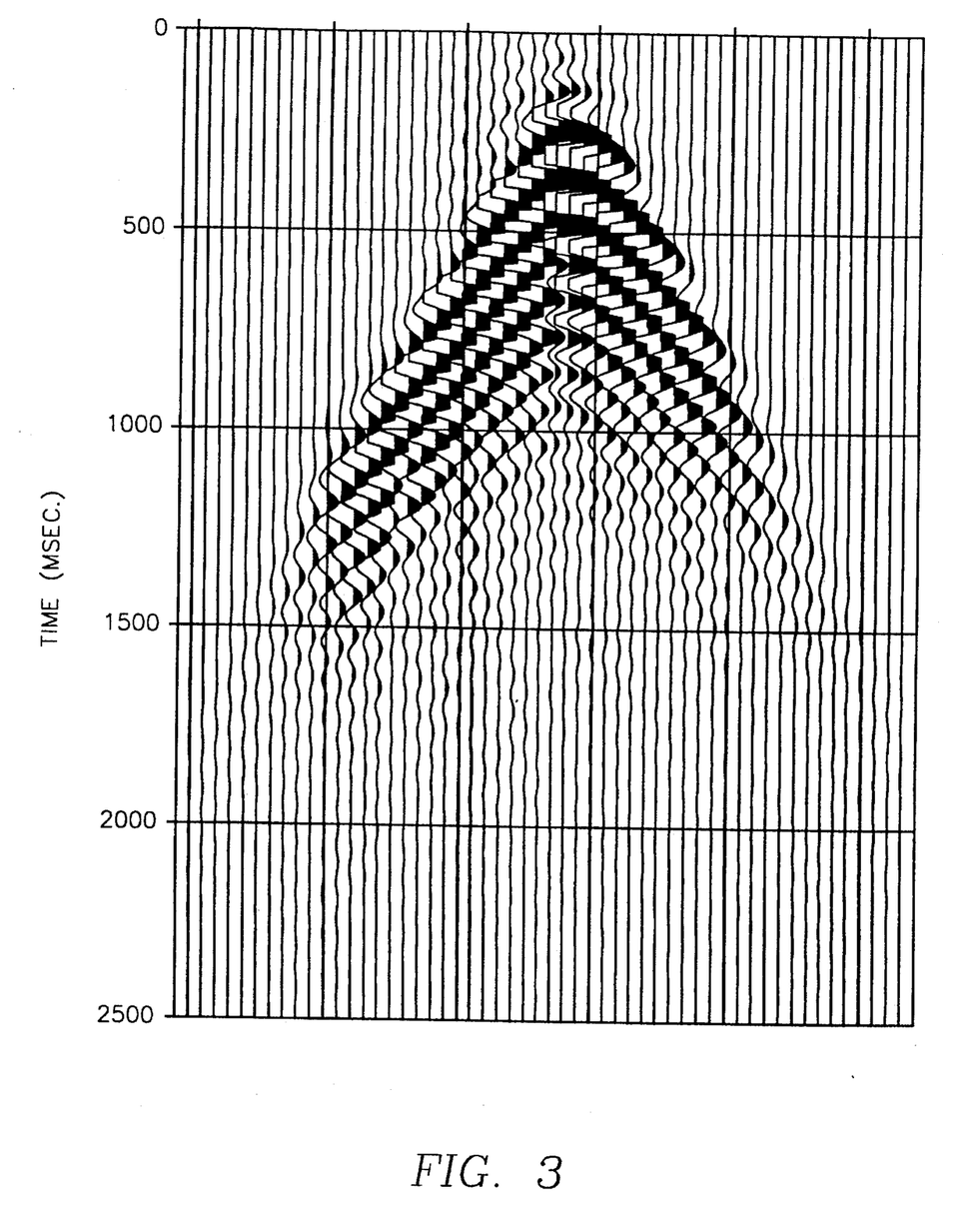
FIG. 3 shows a plot as in FIG. 2 after trace editing and bandpass filtering.

The method of the present invention for determining the acoustic signature of the noise and adaptively filtering the noise, can be better understood by referring to FIGS. 3 through 6. The first step in the method of the present invention is to isolate the noise present in the traces. FIG. 3 represents the signal traces shown in FIG. 2 after application of a 12 Hz low pass filter. Low pass filters are known in the art. The low pass filter can be used because ground roll 22, which is the noise source illustrated in the present example, typically has a frequency content which does not exceed 20 Hz. Application of the 12 Hz low pass filter, therefore, will substantially reduce the amplitude of components of the traces which cannot be caused by ground roll 22. These components include most of the signals caused by reflected seismic energy. The low pass filtered traces shown in FIG. 3 can also be "truncated" or "muted" within time spans shorter than the earliest expected first arrival time of the ground roll 22 at each sensor. Muting is observable as substantially zero signal amplitude on each trace before the first arrival of the ground roll 22. The step of applying the low pass filter is provided when the noise occurs within a frequency band that can be isolated by application of the low pass filter. Low pass filtering is one of several methods known in the art for isolating the noise in the signals generated by the sensors (6A–6Q in FIG. 1).

Other types of noise can be isolated by application of high pass or bandpass filters, depending on the frequency content of the particular type of noise, as is understood by those skilled in the art. Alternatively, if the noise occupies substantially the same frequency band as the seismic signals, for example multiple reflection noise, the step of bandpass filtering can be substituted in the method of the present invention by other isolation methods known in the art such as median filtering or Radon transform (also known as "slant stacking").

It is also possible to isolate the noise by application of methods known in the art such as (f–k) transform filtering. (f–k) transform filtering includes performing a 2-dimensional Fourier transform on a plurality of the traces in order to convert at least a portion of the record section (which is initially a graph with respect to time and position) into a graph with respect to frequency and wavenumber. Noise can be isolated from the (f–k) transformed record section by applying a so-called "velocity filter" to the transformed graph. Noise, which frequently exhibits apparent velocities unrepresentative of velocities of acoustic energy travelling through earth formations, can be substantially isolated by using velocity filters.

The different methods of isolating the noise components in the traces as described herein are not meant to be an exhaustive list of methods of isolating noise. Other methods of isolating different types of noise are known in the art and can be used effectively on the type of noise for which the particular isolation method is suited, as is understood by those skilled in the art. Accordingly, the methods described herein for isolating the noise are not to be construed as a limitation of the invention.

Figure 4:
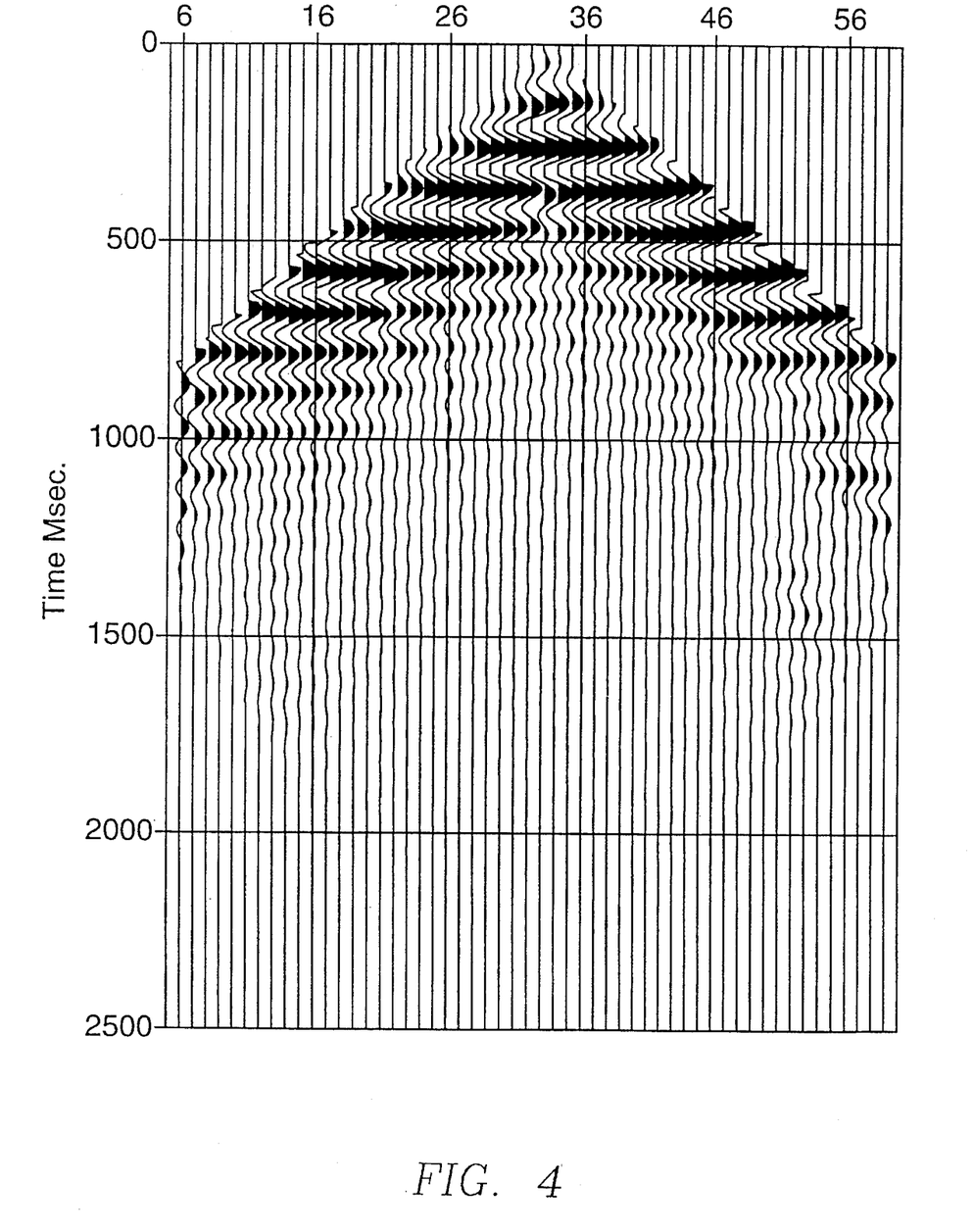
FIG. 4 shows a plot as in FIG. 3 after alignment of the traces on a noise event.

The next step in the method of the present invention is to time-align correlative portions of the noise. FIG. 4 shows the noise-isolated and muted traces previously shown in FIG. 3 after correlative portions of the noise are time-aligned. Time alignment can be performed by visual correlation, or by using a trace-correlation computer program of a type familiar to those skilled in the art. It is to be understood that the manner in which time-alignment of the noise traces is performed is not to be construed as a limitation of the invention.

After the traces are time-aligned, they can be summed or stacked. Stacking is known to those skilled in the art and provides an increase in the apparent amplitude of correlated components of the signal while reducing the amplitude of uncorrelated components of the signal. The amount of correlated component enhancement, and uncorrelated component reduction, is typically in proportion to the square root of the number of traces which are stacked. Residual seismic signal components which may be present in the time-aligned noise-isolated traces, shown in FIG. 4 for example, will typically be reduced in amplitude by a factor of $\sqrt{N}$, where N is the number of traces stacked. The output of the stacking comprises a single trace which typically more faithfully represents the acoustic signature of the noise, since the stacked trace will have enhanced noise component amplitude and reduced amplitude of all other uncorrelated components, including residual seismic reflection components.

Figure 5:
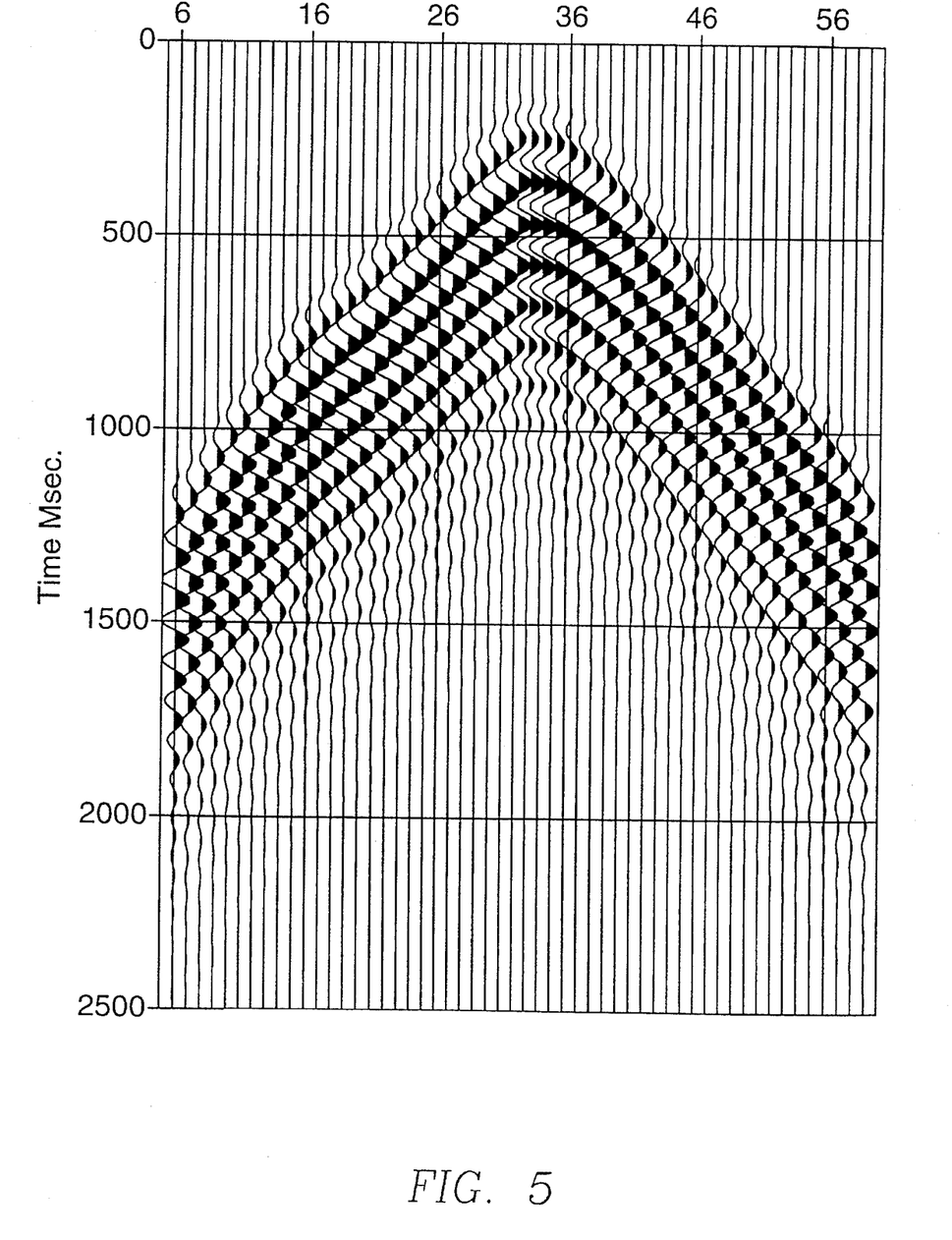
FIG. 5 shows a plot as in FIG. 4 after summing the traces of FIG. 4 and reversing the step of alignment to restore the stacked traces to their original time positions.

The stacked trace can then be included in a new record section, shown for example in FIG. 5, in which the stacked trace is replicated and inserted into every one of the trace positions corresponding to each sensor position in the original record section (FIG. 2). The replicated stacked traces can then be restored to the time alignment of the noise-isolated, muted traces such as those shown in FIG. 3 by reversing the previously described step of time-aligning. Traces which have been replicated from the stacked trace and then restored to the original record section time-alignment are shown in FIG. 5. The traces in FIG. 5 substantially represent the acoustic signature of the isolated noise, which in the present example is the ground roll (14 in FIG. 1). The traces in FIG. 5 can be referred to as noise signature traces.

The noise signature traces can then be used to generate filters for adaptively cancelling noise components in the signal traces (18 in FIG. 2) in the original record section (FIG. 2) by a process known in the art as adaptive filtering. The noise signature traces shown in FIG. 5, are each compared with the position-correspondent trace (18 in FIG. 2) in the original record section (FIG. 2). The step of comparing is used to generate, for each comparison, a linear filter which is applied to the particular noise signature trace. The step of comparing is repeated and the linear filter is adjusted so as to reduce a measure of the difference between the particular signal trace and the particular noise signature trace. The steps of comparing and adjusting the linear filter are repeated until the measure of the difference between the signal trace and the noise signature trace reaches a minimum. Determining the minimum value of the measure of the difference can be performed by a process known in the art as "least squares minimization". The linear filter which generates the minimum difference is then applied to the particular noise signature trace. The filtered noise signature trace is then subtracted from the signal trace. The remainder of the subtraction is a noise-adjusted signal trace. Generating noise adjusted signal traces can be repeated for the other signal traces in the record section to generate a noise-corrected record section. As is understood by those skilled in the art, the length of the filter should be sufficiently short so that the seismic reflection signal components in the signal traces do not substantially affect the linear filter. As is also understood by those skilled in the art, if the seismic signal components of the signal traces have the property of being substantially uncorrelated to the noise components in the signal traces, there is typically no linear filter which when applied to the noise signature trace will generate a filtered noise signature trace capable of cancelling all the seismic reflection signal components by the step of subtraction. However, most of the noise will be cancelled in the step of subtraction.

Alternatively, the process of adaptive filtering can be performed by comparing position-correspondent noise signature traces and signal traces, and generating a cross-equalization filter for each pair of traces compared. Each cross-equalization filter can be applied top the corresponding noise signature trace, generating filtered noise signature traces. The filtered noise signature traces can then be subtracted from the corresponding signal traces just as in the previously described process of generating linear filters. If the cross-equalization filters are suitably constrained, for example, providing only frequency-independent amplitude modification or linear time-shifts, the filtered noise signature traces usually will not substantially affect the seismic reflection signal components in the step of subtracting.

A particular advantage offered by the present invention by adaptively generating filters from comparison of the noise signature traces to the signal traces, is that the step of comparing the signal traces 18 to the noise signature traces uses a noise reference having substantially enhanced noise components and substantially reduced seismic reflection signal (and other uncorrelated) components. The adaptively determined filters are therefore less likely to filter out any seismic reflection signal components when the filters are applied to the signal traces 18.

The processes of adaptive filtering described herein are meant to serve only as examples. Other forms of adaptive filtering are known in the art and may also be applied to the method of the present invention. The processes of adaptive filtering described herein are therefore not to be construed as a limitation of the invention.

Figure 6:
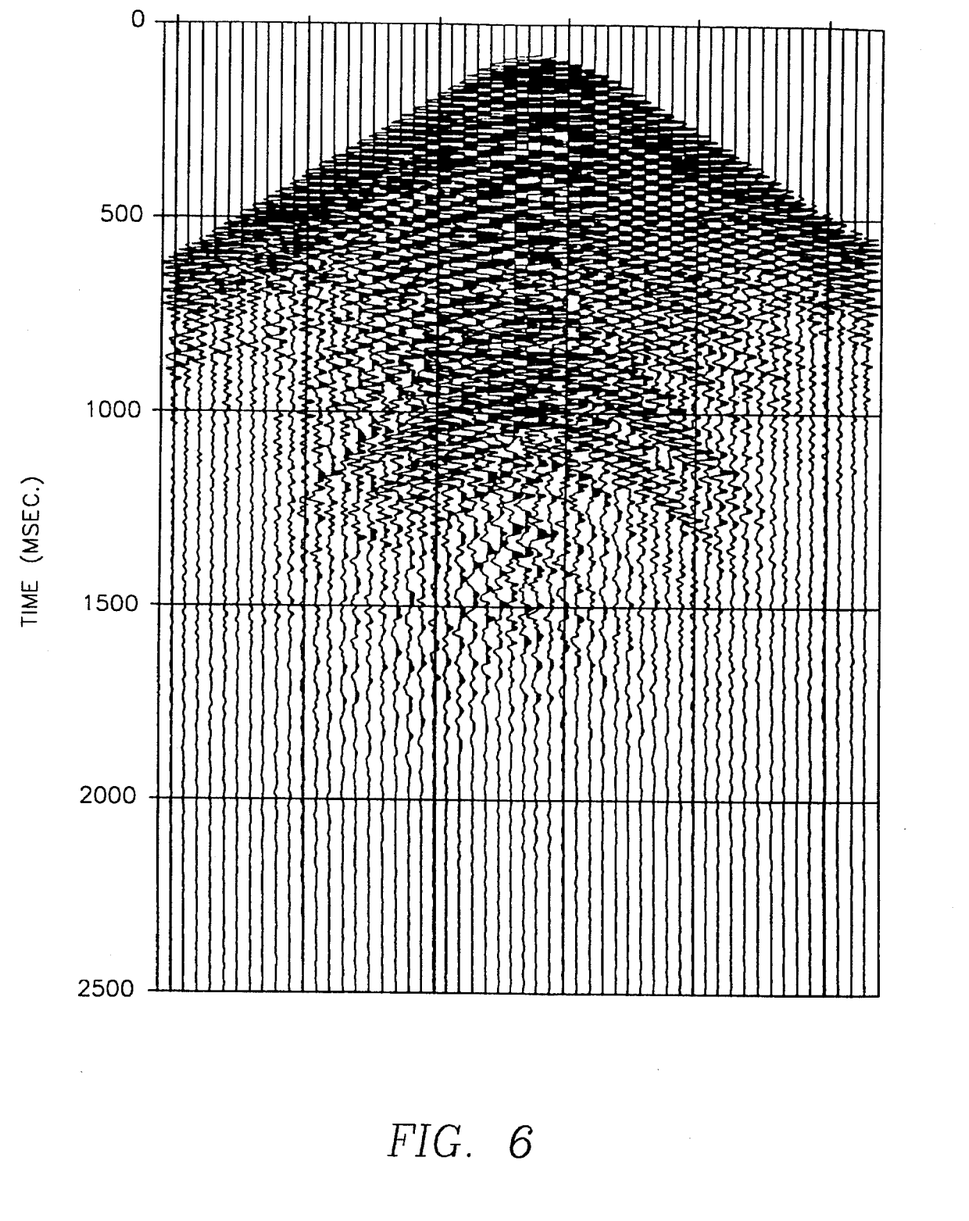
FIG. 6 shows the record section of FIG. 1 after adaptive filtering of the repositioned noise traces shown in the plot of FIG. 5.

Traces which result from adaptive filtering the signal traces 18 can be observed in FIG. 6. FIG. 6 includes noise-corrected traces from which the effects of the ground roll (14 in FIG. 1) particularly have been removed. The record section in FIG. 6 can be referred to as a noise-corrected record section. Further processing of the noise-corrected record section by methods known in the art, such as normal moveout correction, common depth point stacking and bandpass filtering can be performed on the traces in FIG. 6 to produce images (not shown) of subsurface features in the earth (8 in FIG. 1).

It is to be understood that the method of the present invention, as illustrated in the foregoing example, is not limited to reduction of the effects of ground roll on seismic signals. Noise from various other sources that are not correlated to the seismic signals, and can be time aligned, can be reduced by using the method of the present invention. Accordingly, the invention should be limited in scope only by the claims appended hereto.

What is claimed is:

1. A method of reducing noise in seismic signals generated by a plurality of seismic sensors positioned at spaced apart locations from a seismic energy source, said signals represented by signal traces in a record section, said method comprising the steps of:

isolating said noise in said signal traces to generate noise-isolated traces;

time-aligning corresponding portions of said noise in said noise-isolated traces;

stacking said time-aligned noise-isolated traces to generate a stacked noise trace;

replicating said stacked noise trace at corresponding trace positions in said record section;

restoring said replicated traces to original time alignment by reversing said step of time-aligning, thereby generating noise signature traces;

comparing said noise signature traces to corresponding ones of said signal traces;

generating a filter for each said noise signature trace which is compared to said corresponding signal trace, said filter substantially minimizing a measure of the difference between said noise signature trace and said corresponding signal trace;

filtering said noise signature traces by said filters to generate filtered noise signature traces; and subtracting said filtered noise signature traces from corresponding ones of said signal traces to generate noise-corrected signal traces.

2. The method as defined in claim 1 wherein each of said signal traces comprises recordings of signals generated by a corresponding one of said seismic sensors.

3. The method as defined in claim 1 wherein said signal traces comprise CMP stacks of said seismic signals generated by said sensors.

4. The method as defined in claim 1 wherein said signal traces comprise CSP stacks of said seismic signals generated by said sensors.

5. The method as defined in claim 1 wherein said step of isolating said noise comprises bandpass filtering.

6. The method as defined in claim 1 wherein said step of isolating said noise comprises median filtering.

7. The method as defined in claim 1 wherein said step of isolating said noise comprises (f–k) transform filtering.

8. The method as defined in claim 1 wherein said step of isolating said noise comprises Radon transforming.

9. The method as defined in claim 1 wherein said step of time aligning comprises correlation.

10. The method as defined in claim 1 wherein said noise comprises ground roll.

11. The method as defined in claim 1 wherein said noise comprises mud roll.

12. The method as defined in claim 1 wherein said sensors comprise geophones.

13. The method as defined in claim 1 wherein said sensors comprise hydrophones.

14. The method as defined in claim 1 wherein said steps of comparing, generating a filter, filtering and subtracting comprise linear adaptive filtering.

15. The method as defined in claim 1 wherein said steps of comparing, generating a filter, filtering and subtracting comprise constrained cross-equalization filtering.

16. A method of processing seismic data comprising:

generating a record section of said seismic data, said record section including signal traces corresponding to signals generated by seismic sensors positioned at predetermined positions with respect to a seismic energy source;

isolating noise components in said signal traces;

time aligning corresponding portions of said noise components in said traces, thereby generating time-aligned noise traces;

stacking said time-aligned noise traces, thereby generating a stacked noise trace;

replicating said stacked noise trace at each corresponding trace position in said record section;

restoring said replicated traces to original time positions by reversing said step of time-aligning thereby generating noise signature traces;

comparing said noise signature traces to corresponding ones of said signal traces;

generating a filter for each said noise signature trace which is compared to said corresponding signal trace, said filter substantially minimizing a measure of the difference between said noise signature trace and said corresponding signal trace;

filtering said noise signature traces by said filters to generate filtered noise signature traces; and subtracting said filtered noise signature traces from corresponding ones of said signal traces to generate noise-corrected signal traces.

17. The method as defined in claim 16 wherein said step of isolating said noise comprises bandpass filtering.

18. The method as defined in claim 16 wherein said step of isolating said noise comprises median filtering.

19. The method as defined in claim 16 wherein said step of isolating said noise comprises (f–k) transform filtering.

20. The method as defined in claim 16 wherein said step of isolating said noise comprises Radon transforming.

21. The method as defined in claim 16 wherein said step of time aligning comprises correlation.

22. The method as defined in claim 16 wherein said noise comprises ground roll.

23. The method as defined in claim 16 wherein said noise comprises mud roll.

24. The method as defined in claim 16 wherein said sensors comprise geophones.

25. The method as defined in claim 16 wherein said sensors comprise hydrophones.

26. The method as defined in claim 16 wherein said steps of comparing, generating a filter, filtering and subtracting comprise linear adaptive filtering.

27. The method as defined in claim 16 wherein said steps of comparing, generating a filter, filtering and subtracting comprise constrained cross-equalization filtering.

* * * * *